F. C. HAYS.
Improvement in Nut-Locks.
No. 129,822.
Patented July 23, 1872.
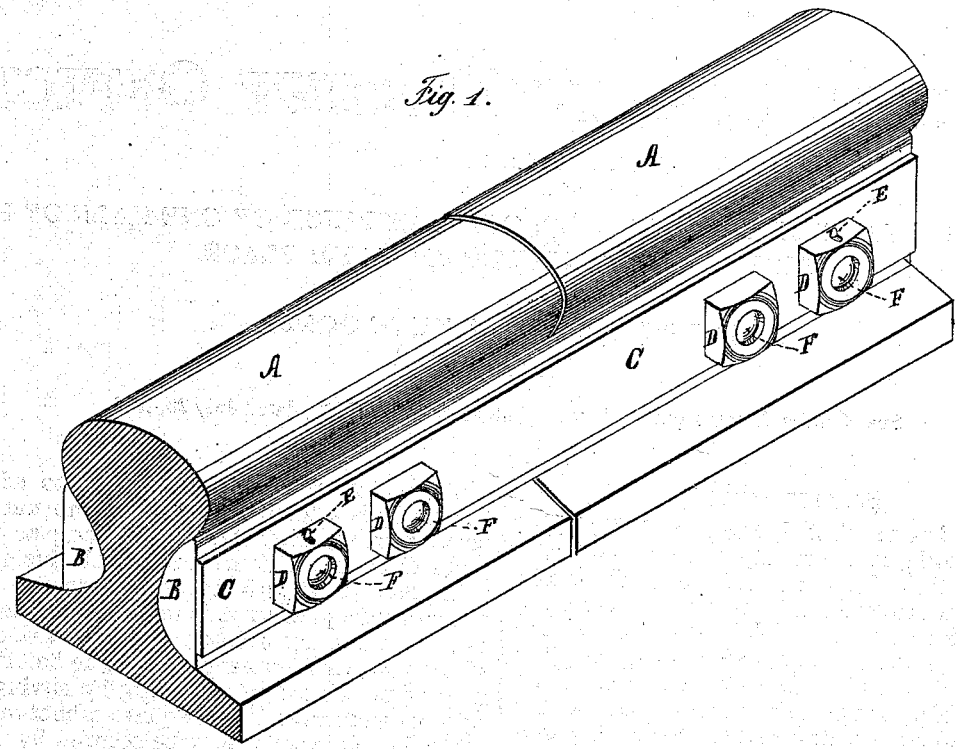
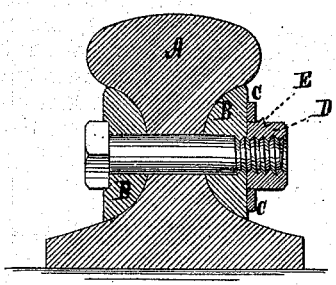
WITNESSES:
Herm. Lauten
Harry Coleman
INVENTOR:
Festus C. Hays.
By
Wells W. Leggett.
Attorney.

UNITED STATES PATENT OFFICE.

FESTUS C. HAYS, OF UHRICKSVILLE, OHIO, ASSIGNOR OF ONE-HALF OF HIS RIGHT TO S. S. SULTZER, OF SAME PLACE.

IMPROVEMENT IN NUT-LOCKS.

Specification forming part of Letters Patent No. 129,822, dated July 23, 1872.

SPECIFICATION.

Be it known that I, FESTUS C. HAYS, of Uhricksville, in the county of Tuscarawas and State of Ohio, have invented certain new and useful Improvements in Nut-Locks for Fish-Joints, &c.; and I do hereby declare that the following is a full, clear, and exact description thereof, that will enable others skilled in the art to which it appertains to make and use the same, reference being had to the accompanying drawing and to the letters of reference marked thereon, which form a part of this specification.

In the drawing, Figure 1 is a view in perspective of the ends of two rails united by a fish-joint, in which A are the rails; B, the fish-plates; C, the plate which locks the nuts D D; E, the lips that lock the plate C from coming off the nuts.

My invention consists in locking the nuts used upon the bolts in a fish-joint, or in other localities, from turning upon the bolts; and to accomplish this in a fish-joint I proceed as follows:

A plate, C, is so prepared with holes at the proper interval that when the nuts have been screwed down upon the bolts flush with the fish-plate this plate C can then be placed over the bolts against the fish-plate in such manner that the nuts will project through the holes in the plate, which are made so as just to admit them. This effectually locks all the nuts so as to prevent their turning as long as this plate C is in position. I now lock this plate C in position by striking with a proper tool against the upper surface of the two extreme nuts, and raising thereon the lips E E, over which the plate C cannot pass. The bolt itself may be prevented from turning by having its square head drawn into a square rabbet in the other fish-plate; or it may be secured by various other devices.

I know that the idea of locking the nuts by the plate C is old, and I do not, therefore, claim it; but What I do claim as new, and desire to secure by Letters Patent, is—

A nut-lock consisting of the plate C, perforated so as to pass over the heads of the nuts D, and retained in position by means of the lips E raised upon the sides of the nuts, substantially as set forth.

In testimony that I claim the foregoing, I have hereunto set my hand this 19th day of June, 1872.

FESTUS C. HAYS.

Witnesses:
 JOHN MILONE,
 GEO. W. DAWSER.